United States Patent [19]

Rossback et al.

[11] Patent Number: 5,468,464
[45] Date of Patent: Nov. 21, 1995

[54] PROCESS FOR THE PREPARATION OF METAL HYDRIDES

[75] Inventors: Matthew A. Rossback, Albany; Timothy R. McQueary, Sweet Home, both of Oreg.

[73] Assignee: Teledyne Industries, Inc., Albany, Oreg.

[21] Appl. No.: 178,631

[22] Filed: Jan. 7, 1994

Related U.S. Application Data

[63] Continuation of Ser. No. 37,514, Mar. 24, 1993, abandoned, which is a continuation of Ser. No. 721,891, Jun. 27, 1991, abandoned.

[51] Int. Cl.$^6$ ............................................. C01B 6/24
[52] U.S. Cl. ........................................ 423/644; 423/62
[58] Field of Search ....................................... 423/644, 62

[56] References Cited

U.S. PATENT DOCUMENTS

| | | | |
|---|---|---|---|
| 2,682,445 | 6/1954 | Basel | 23/87 |
| 3,053,620 | 9/1962 | Greenberg et al. | 23/87 |
| 3,230,077 | 1/1966 | Hiller | 75/84.5 |
| 3,425,826 | 2/1969 | Schmidt et al. | 75/84 |
| 4,211,754 | 7/1980 | Van Hecke et al. | 423/62 |
| 4,318,897 | 3/1982 | Gonczy | 423/644 |
| 4,425,318 | 1/1984 | Maeland et al. | 423/644 |
| 4,440,737 | 4/1984 | Libowitz et al. | 423/644 |
| 4,720,300 | 1/1988 | Nishizawa et al. | 75/85.4 |
| 4,727,928 | 3/1988 | De Vynck et al. | 164/469 |
| 4,728,507 | 3/1988 | Worcester | 423/645 |
| 4,913,778 | 4/1990 | Lee et al. | 203/29 |
| 5,188,810 | 2/1993 | Sommers | 423/62 |
| 5,211,291 | 5/1993 | Sommers et al. | 423/62 |

FOREIGN PATENT DOCUMENTS

| | | |
|---|---|---|
| 470022 | 12/1950 | Canada . |
| 541516 | 5/1957 | Canada ................... 75/622 |
| 541517 | 5/1957 | Canada ................... 75/622 |
| 554840 | 3/1958 | Canada . |
| 903034 | 2/1954 | Germany . |
| 1068683 | 11/1959 | Germany . |
| 1082240 | 5/1960 | Germany . |
| 771144 | of 0000 | United Kingdom . |
| 660397 | 11/1951 | United Kingdom . |
| 866771 | 7/1961 | United Kingdom . |
| 910289 | 11/1962 | United Kingdom . |
| 1211757 | 3/1973 | United Kingdom . |

OTHER PUBLICATIONS

Hart, The Reduction of Columbic Acid and the Measurement of the Oxidation Potential of the Pentavalent–Trivalent Columbium System, 226–7, 1926.

Sherwood, Columbium, Rare Metals Handbook, pp. 149–177.

McClain et al., Zirconium–Hafnium Separation, Chapter 4, pp. 64–73, 1960.

Kroll et al., Pilot Plants, Production of Malleable Zirconium, vol. 42, No. 2, pp. 395–396, 1950.

Fairgrieve et al., Hafnium, Molybdenum Techniques Revealed, Journal of Metals, pp. 25–26, 1960.

Spink, Fused–Salt Scrubbing of Zirconium Tetrachloride, Transactions Aime, vol. 224, pp. 965–970, 1962.

Fairbrother, The Chemistry of Niobium and Tantalum, pp. 4, 5, 8–19, 1967.

de Hoboken, Production of Tantalum and/or Columbium, pp. 1–6.

Pennington, Derivatives of Columbium and Tantalum, 1985.
Duke, Resources and Planning Advisory Council, vol. VIII, pp. 1–51, 1969.

Stuart, Niobium, Proceedings of the International Symposium, pp. 3–16; 1237–1249, 1981.

Gibalo, Analytical Chemistry of Niobium and Tantalum, pp. 118–140, 1970.

Merrill, The Separation of Columbium and Tantalum by Means of Selenium Oxychloride, pp. 2378–2383, 1921.

Hattagadi, "How to Set a Periodic Table", *Industrial Chemist*, vol. 9, No. 5, May 1988, pp. 20–23.

*Primary Examiner*—Wayne Langel
*Attorney, Agent, or Firm*—Shoemaker and Mattare, Ltd.

[57] ABSTRACT

A process for the low temperature, low pressure preparation of the hydride product of ferroalloys of Group IV and Group V metals including niobium, tantalum, vanadium, and silicon and the novel hydride product of ferroniobium.

3 Claims, No Drawings

PROCESS FOR THE PREPARATION OF METAL HYDRIDES

This is a Continuation of application Ser. No. 08/037,514 filed Mar. 24, 1993, abandoned, which is a continuation of Ser. No. 07/721,891 filed Jun. 27, 1991, abandoned,

FIELD OF THE INVENTION

This invention relates generally to the production of ferroalloy metal hydrides and more particularly to a process for producing ferroalloy metal hydrides where the metal is selected from the metals of Group IV and Group V metals, and more particularly, metals selected from the group consisting of Nb, Ta, Va, and Si, and most particularly, to a process for producing a novel ferroniobium hydrided product from ferroniobium alloys.

BACKGROUND OF THE INVENTION

Metallurgical grade ferroniobium alloys (FeNb) contain predominately iron and niobium and preferably more than 50% by weight niobium and most preferably 63% to 67% by weight niobium with the balance including iron and minor amounts of silicon and smaller amounts of aluminum, phosphorous and titanium. Ferroniobium and other such ferroalloys are relatively inert. For example, FeNb can withstand immersion in concentrated hydrochloric acid for prolonged periods of time without any apparent solubilization and leaching of its iron content. Likewise, it can withstand prolonged exposure to air at ambient temperatures with little or no weight gain.

Further, ferroniobium, while seemingly a good intermediate or starting material for the preparation of niobium compounds or niobium metal, has previously not been suitable for this purpose for several reasons. In addition to its non-reactive characteristics, it is also quite hard and, therefore, difficult to comminute into small enough particles to be commercially suitable for subsequent reaction schemes.

One possible solution to these drawbacks would be the formation of hydrogen containing compounds of ferroniobium or of its niobium content since hydrogen embrittlement is a well recognized phenomenon. The traditional method for hydriding Nb and Nb alloys has been to use high temperature and moderate pressures to facilitate hydrogen absorption. The absorption of hydrogen into iron and niobium has been discussed ("Metal Hydrides", Academic Press, New York and London, 1968, Nb pgs. 602–603, Fe pgs. 85, 627–628) with reference to temperatures of 400° C. to 800° C. and moderate pressures. Further work described in U.S. Pat. No. 4,440,737 discusses room temperature reaction of vanadium based alloys with hydrogen requiring pressures of 50–70 atm. Hydrogen storage systems involving ferrovanadium alloy are described in U.S. Pat. No. 4,318,897 which requires activation of the alloy using vacuums of the order of $10^{-3}$ Torr and temperatures of 600° C. before room temperature hydride formation is conducted at 50 to 70 atmos.

These reactions are unattractive commercially as a starting point for methods for extracting values from ferrometal alloys.

OBJECTS OF THE INVENTION

It is, therefore, an object of the present invention to provide a new process for producing ferrometal alloy hydrides and to provide a novel composition of matter from ferroniobium which is easily comminuted into preselected particle sizes and which is capable of being readily reacted with other selected reactants to produce other ferroniobium compositions or compositions of iron and niobium which may be separated or further treated or reacted to produce desired compounds for separation or other purposes such as the production of niobium nitride, niobium oxide, niobium carbides, niobium metal and the like.

BRIEF DESCRIPTION OF THE INVENTION

The present invention provides a process for the reaction of ferroniobium with hydrogen gas in a vacuum tight vessel at ambient temperatures and low pressures to produce an easily comminutable, readily reactable ferroniobium alloy containing hydrogen. The principle discovery of this invention, that hydrogen is so readily absorbed, and with such profound effect on the chemical and mechanical properties, is completely unexpected based upon prior experiences with the difficulty of hydrogen uptake in Nb-based materials.

DETAILED DESCRIPTION OF THE PREFERRED EMBODIMENT

Metallurgical grade ferroniobium can be characterized as containing as little as 50% by weight niobium, but for the preferred practice of this invention, it should contain from about 63% to 67% by weight of niobium with the balance being iron and minor amounts of silicon and smaller amounts of aluminum, tantalum, phosphorous and titanium. The preselected ferroniobium is converted easily to a stable composition containing from about 200 to about 2000 ppm hydrogen by the process described hereinafter. The composition of the present invention, while not fully characterized or understood, is novel and exhibited strikingly different physical structural and chemical properties than the known metal hydrides of its constituent metal, as will be more fully described hereinafter.

Typically, ferroniobium is placed in a vacuum tight metal vessel which is then evacuated. Hydrogen is then backfilled into the vessel to a pressure less than one atmosphere of over atmospheric pressure and more preferably from about 2 to 15 pounds pressure, and more preferably from about 3 to about 5 psig and the reaction with hydrogen commences immediately at ambient temperature. The ambient temperature as used herein can be any temperature in the range of from about 10° C. to about 50° C. The reaction which accompanies the takeup of hydrogen is characterized by a rise in temperature since the reaction is exothermic. When no further takeup of hydrogen is observed, excess hydrogen is pumped off to allow for recovery of the reaction product of ferroniobium and hydrogen. The resulting hydride can be readily broken apart by the fingers. Further reduction in size is most economically done by rod milling or disc pulverizing.

The following Examples further describe and define the process and product of the present invention.

EXAMPLE 1

A charge of 1293 gm of metallurgical grade FeNb was loaded into trays which were placed in a metal vessel. The vessel was evacuated to 1 micron and then backfilled with hydrogen to 5 psig. Initial hydrogen uptake was within 20 minutes and was completed in 1½ hours. A total of 63.6 liters of $H_2$ was absorbed. The resulting FeNb hydride was easily reduced in size to less than 140 mesh for further processing.

Typical hydrogen contained was analyzed to be from about 200 ppm to about 2000 ppm. A typical value of hydrogen content of the hydride product was about 1200 ppm.

Furthermore, after such hydrogen uptake, the hydride product exhibited a new diffraction line in its X-ray diffraction pattern at 2.43 Å compared with commercially obtained niobium hydride produced from the pure metal under pressure. The new composition of matter had the following analysis.

TABLE 1

|    | % by wt.                                   |
|----|--------------------------------------------|
| Nb | 63–65                                      |
| Fe | 25–31                                      |
| Si | 0–3                                        |
| Ti | 0–1                                        |
| Al | 0–1                                        |
| H  | 200–2000 ppm (wt) preferably 800–1500 ppm  |

EXAMPLE 2

In this example, 1003 gm of FeNb was loaded in trays and placed in the metal vessel used in Example 1. The vessel was evacuated to 1 micron and backfilled with hydrogen to 3.5 psig. After pressurization, 53.1 liters were observed to have been absorbed in 30 minutes at room or ambient temperature. The hydrogen was turned off, the vessel was pumped down to remove excess hydrogen and the product of the reaction of the hydrogen and FeNb was unloaded. The resulting material was again easily reduced in size for further processing.

EXAMPLE 3

In this example, 1871 gm of FeNb were charged into the metal vessel in the manner described in Examples 1 and 2. The vessel was evacuated using a mechanical pump and roots blower. The vessel was evacuated to 40 microns and then backfilled with hydrogen gas. The total hydrogen absorbed or used after 23 minutes was 43.3 liters. The pressure was 2.5 psig and the flow rate of hydrogen was 1.04 liters per minute at this point. After 60 more minutes, the flow rate was down to 0.01 liters per minute and the pressure was 4.4 psig. The total absorbed hydrogen was 68.0 liters. At this point, the vessel was evacuated and backfilled with argon before opening and recovering the reaction product.

To test the grindability of FeNb compared to the hydrided FeNb, a sieve test was done. To do the testing, a set of four 8 inch U.S. standard testing sieves were used. Their mesh sizes were 12, 60, 140 and 270. A Tyler Ro-tap testing sieve shaker number 13847 was used. Four runs were done, two using FeNb as charged and two using the hydrided FeNb prepared as described hereinbefore. Each Ro-tap run would last 30 minutes and have 500 g of material. The results of these runs are listed below.

TABLE 2

| Run | +12   | −12 +60 | −60 +140 | −140 +270 | −270  | Total |
|-----|-------|---------|----------|-----------|-------|-------|
| 1   | 488   | 4       | 3        | 2         | 3     | 500   |
|     | 97.6% | 0.8%    | 0.6%     | 0.4%      | 0.6%  |       |
| 2   | 488   | 4       | 2        | 2         | 4     | 500   |
|     | 97.6% | 0.8%    | 0.4%     | 0.4%      | 0.8%  |       |
| 3   | 16    | 322     | 97       | 36        | 29    | 500   |
|     | 3.2%  | 64.4%   | 19.4%    | 7.2%      | 5.8%  |       |
| 4   | 14    | 323     | 97       | 37        | 29    | 500   |
|     | 2.8%  | 64.6%   | 19.4%    | 7.4%      | 5.8%  |       |

In Table 2, runs 1 and 2 show the result of Ro-tap testing of commercially available FeNb. The largest percentage, i.e., over 90%, of sizes after the test was in the category over 12. Conversely, the hydrided FeNb in runs 3 and 4 are easily comminuted during the test showing a majority of sizes in the less than 12 to over 60 range to more than 140 mesh. The relatively mild conditions of the test demonstrates the substantial change in physical properties achieved by the room temperature low pressure hydrogenation of FeNb.

The invention has been described in terms of the best mode known to the inventors at the time of filing the application.

The invention as claimed is intended to encompass all of the possible methods of preparation and products which could be employed and produced within the scope of the claims as limited by the pertinent prior art.

We claim:

1. A process for the production of an easily comminutable hydride product comprising the steps of:

a) evacuating a gas-tight container containing a charge of ferroalloy at a temperature of from about 10° C. to about 50° C., wherein the non-ferrous metal of the ferroalloy is niobium which is 63–65% by weight of the ferroniobium, b) providing an overpressure of a hydrogen containing gas of from about 2 psig to about 15 psig on the charge of ferroalloy for a sufficient period of time and at a temperature of from about 10° C. to about 50° C. until hydrogen take up by the charge has ceased, and c) recovering the friable hydride product produced.

2. The process of claim 1, wherein the temperature at which the hydriding reaction starts is from about 18° C. to about 30° C.

3. The hydride product of the reaction between hydrogen and ferroniobium, wherein ferroniobium containing about 63% to about 65% by weight niobium is contacted at a temperature of from about 18° C. to about 30° C. with a hydrogen-containing gas for a sufficient period of time at a pressure of from about 2 to about 15 psig to produce a hydride containing from between about 200 ppm to about 2000 ppm hydrogen which exhibits an X-ray diffraction line at about 2.43 Å.

\* \* \* \* \*